United States Patent
Milanesi et al.

(10) Patent No.: US 9,647,557 B2
(45) Date of Patent: May 9, 2017

(54) THREE PHASES CONTROLLER FOR BUCK-BOOST REGULATORS

(71) Applicant: Maxim Integrated Products, Inc., San Jose, CA (US)

(72) Inventors: Andrea Milanesi, Milan (IT); Saverio De Palma, Milan (IT); Giuseppe Luciano, Brugherio (IT)

(73) Assignee: Maxim Integrated Products, Inc., San Jose, CA (US)

(*) Notice: Subject to any disclaimer, the term of this patent is extended or adjusted under 35 U.S.C. 154(b) by 0 days.

(21) Appl. No.: 14/659,321

(22) Filed: Mar. 16, 2015

(65) Prior Publication Data

US 2016/0094125 A1   Mar. 31, 2016

Related U.S. Application Data

(60) Provisional application No. 62/055,187, filed on Sep. 25, 2014.

(51) Int. Cl.
| | |
|---|---|
| *H02M 3/158* | (2006.01) |
| *H02M 1/00* | (2006.01) |
| *G05F 1/45* | (2006.01) |
| *G05F 3/16* | (2006.01) |

(52) U.S. Cl.
CPC ........ *H02M 3/1584* (2013.01); *H02M 3/1582* (2013.01)

(58) Field of Classification Search
CPC ............... H02M 3/158; H02M 3/1582; H02M 2003/1586; H02M 3/1584; H02M 2001/00; H02M 2001/0032; H02M 2001/0035; G05F 1/24; G05F 1/26; G05F 1/30; G05F 1/452; G05F 3/16

USPC ........ 323/259, 261, 263, 265–275, 280–285, 323/344–346, 349–352
See application file for complete search history.

(56) References Cited

U.S. PATENT DOCUMENTS

| | | | | |
|---|---|---|---|---|
| 5,734,258 A * | 3/1998 | Esser | .................. | H02M 3/1582 323/224 |
| 6,275,016 B1 * | 8/2001 | Ivanov | .................. | H02M 3/158 323/224 |
| 7,176,667 B2 * | 2/2007 | Chen | ..................... | H02M 1/44 323/282 |
| 7,298,119 B1 * | 11/2007 | Amram Summit | . | H02M 3/1582 323/225 |
| 7,453,247 B2 * | 11/2008 | de Cremoux | ....... | H02M 3/1582 323/225 |
| 7,944,191 B2 * | 5/2011 | Xu | ..................... | H02M 3/1588 323/225 |

(Continued)

*Primary Examiner* — Timothy J Dole
*Assistant Examiner* — Sisay G Tiku
(74) *Attorney, Agent, or Firm* — North Weber & Baugh LLP

(57) ABSTRACT

Systems, devices and methods using three separate switching phases for a buck-boost regulator are disclosed. The regulator may operate in a boost mode, a buck mode or in a buck-boost mode. The output voltage remains constant through mode changes and the ripple voltage is well-controlled. If the input voltage is lower than the output voltage by a first threshold, the regulator operates in boost (step-up) mode. If the input voltage is higher than the output voltage by a second threshold, it operates in buck (step-down) mode. The regulator operates in the buck-boost mode when the difference between the input and output voltages is within a certain range.

18 Claims, 11 Drawing Sheets

(56) References Cited

U.S. PATENT DOCUMENTS

| | | | | |
|---|---|---|---|---|
| 8,294,439 B2* | 10/2012 | Lu | ............ | H02J 7/0031 323/224 |
| 8,415,933 B2* | 4/2013 | Loikkanen | ............ | G05F 1/618 323/225 |
| 8,593,122 B2* | 11/2013 | Chen | ............ | H02M 3/1582 323/284 |
| 8,791,672 B2* | 7/2014 | Klein | ............ | H02M 3/1582 323/222 |
| 8,853,888 B2* | 10/2014 | Khaligh | ............ | H02M 1/10 307/52 |
| 2006/0055384 A1* | 3/2006 | Jordan | ............ | H02M 3/158 323/282 |
| 2008/0169796 A1* | 7/2008 | Buethker | ............ | H02M 3/1582 323/282 |
| 2011/0037446 A1* | 2/2011 | Engelhardt | ............ | H02M 3/1582 323/282 |
| 2012/0229110 A1* | 9/2012 | Huang | ............ | H02M 3/1582 323/282 |
| 2014/0084884 A1* | 3/2014 | Lee | ............ | H02M 3/157 323/271 |
| 2014/0225577 A1* | 8/2014 | Ivanov | ............ | H02M 3/1582 323/225 |
| 2014/0266085 A1* | 9/2014 | Unno | ............ | H02M 3/04 323/234 |
| 2015/0229215 A1* | 8/2015 | Choudhary | ............ | H02M 3/1582 323/271 |
| 2016/0105110 A1* | 4/2016 | Houston | ............ | H02M 3/1582 323/271 |

* cited by examiner

THREE PHASES CONTROLLER FOR BUCK-BOOST REGULATORS

CROSS-REFERENCE TO RELATED APPLICATIONS

This application is related to and claims the priority benefit of U.S. Provisional Application No. 62/055,187, filed Sep. 25, 2014, titled, "Three Phases Controller for Buck-Boost Regulators," and listing as inventors, Andrea Milanesi, Saverio De Palma, and Giuseppe Luciano, which application is hereby incorporated herein by reference in its entirety.

BACKGROUND

A. Technical Field

The present invention relates generally to DC-to-DC converters and more particularly to DC-to-DC converters with a three phases controller.

B. Background of the Invention

A DC-to-DC converter is an electronic circuit which converts a source of direct current (DC) from one voltage level to another. DC-to-DC converters are important in portable electronic devices such as cellular phones and laptop computers, which are primarily supplied with power by batteries. It is important that a consistent voltage is supplied as a battery discharges. Switched DC-to-DC converters are one solution such that a decaying voltage level from a battery is compensated with the converter.

DC-DC switching converters may function as boost, buck or buck-boost converters. The buck-boost converter is a type of DC-to-DC converter that has an output voltage magnitude that is either greater than or less than the input voltage magnitude. The buck-boost converter uses either an inverting topology or buck converter combined with a boost converter topology. For an inverting topology, the output voltage is has an opposite polarity than the input. This is a switched-mode power supply with a similar circuit topology to the boost converter and the buck converter. The output voltage is adjustable based on the duty cycle of the switching transistor. A buck converter combined with boost converter topology results in the output voltage typically being the same polarity as the input, but may be lower or higher than the input. Such a non-inverting buck-boost converter may use a single inductor, which is used for both the buck inductor and the boost inductor, or use multiple inductors but only a single switch as in SEPIC (Single-ended primary-inductor converter) and Ćuk topologies.

A typical drawback for inverting buck-boost topology is that the switching action of the power transistor creates a high current ripple in the input capacitors and thus has a limited line transient performance.

Therefore, it would be desirable to have a system, device and method to provide a flexible and robust buck-boost converter or regulator solution.

SUMMARY OF THE INVENTION

Certain embodiments of the invention provide for systems, devices and methods using three separate switching phases for buck-boost regulators. As previously described, a typical buck-boost DC regulator has limited line transient performance. When a low output current ripple is necessary, a more flexible and robust buck-boost regulator solution is needed.

According to various embodiments of the invention, a three phase buck-boost regulator is disclosed. The regulator may work in a boost mode, a buck mode or in a buck-boost mode. The regulator operates with two phases in either the boost or the buck mode or three phases in the buck-boost mode.

In one embodiment, the regulator may operate in a boost mode, a buck mode or in a buck-boost mode. The output voltage remains constant through mode changes and the ripple voltage is well-controlled. If the input voltage is lower than the output voltage by a first threshold, the regulator operates in boost (step-up) mode. If the input voltage is higher than the output voltage by a second threshold, it operates in buck (step-down) mode. The regulator operates in the buck-boost mode when the difference between the input and output voltages is within a certain range.

In certain embodiments, the actual working mode is selected using two comparison results. When the input voltage is less than the output voltage by a first threshold, the regulator is operating in the boost mode. When the input voltage is larger than the output voltage by a second threshold, the regulator is operating in the buck mode. When the input voltage is between the first threshold and the second threshold, the buck-boost mode is selected.

In one embodiment, the buck-boost regulator comprises a plurality of controllable switches and an inductor as energy storage means. The switches may be switched ON/OFF depending on the comparison results between input voltage and output voltage. In boost mode, the inductor current path is between input and ground. In buck mode, the inductor current path is between ground and output. In buck-boost mode, the inductor current path is between ground and output.

Aspects of this invention apply to DC buck-booster regulator apparatuses using an inductor as energy storage component. The inventions disclosed here also apply to DC buck-booster regulator apparatuses that utilize other energy storage components, such as multiple inductors, one or more capacitors, combination of capacitors and inductors, etc. For simplicity and clarity, the invention will be described in this document using one inductor as an example. The invention described in this document using other energy storage components is also covered within the scope of this invention.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment" it is intended mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Various embodiments of the invention are used for buck-boost DC converter. The converter comprises a plurality of components including logic circuits, switches, etc. These components may be integrated in one or more modules or chips. Various modifications may be still within the scope of this invention.

Figure 1:
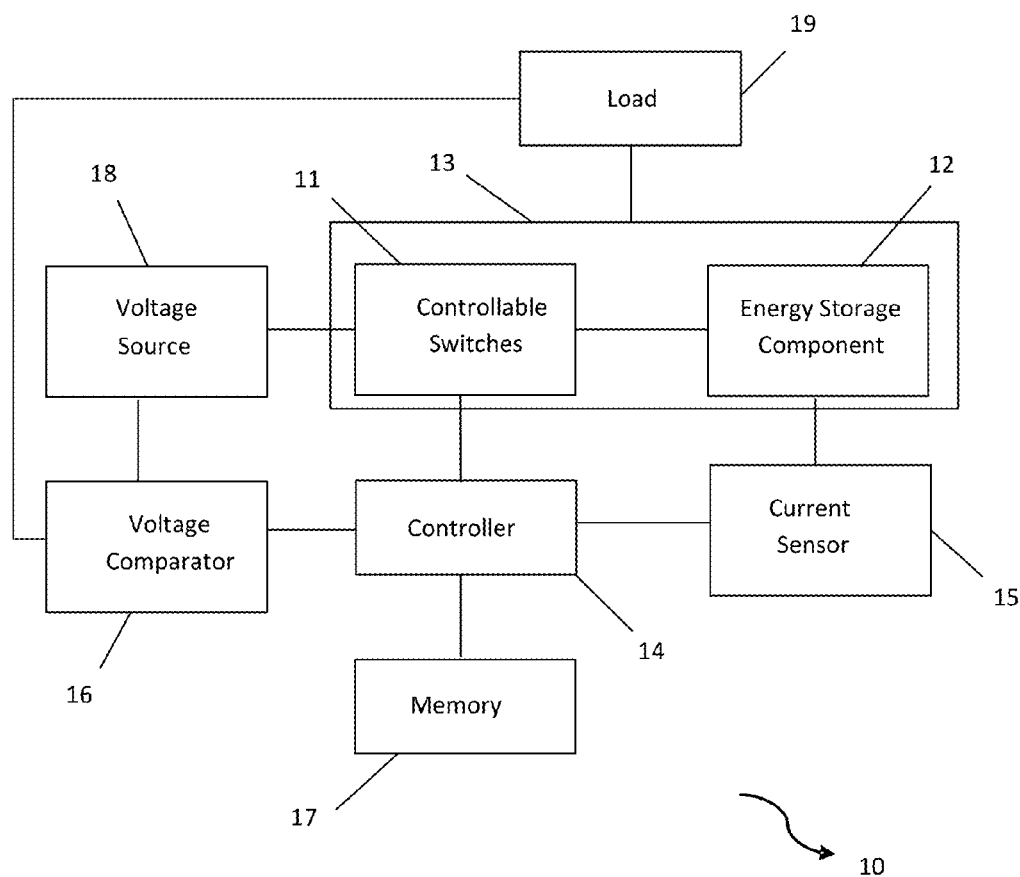
FIG. 1 is a block schematic diagram of a buck-boost regulator according to various embodiments of the invention.

FIG. 1 is a block schematic diagram of a buck-boost regulator 10 according to various embodiments of the invention. The buck-boost regulator 10 comprises a DC conversion circuit 13, a controller 14 and a voltage comparator 16. The DC conversion circuit 13, coupled between a voltage source 18 and a load 19, comprises at least one energy storage component 12 and a plurality of controllable switches 11 controlled by the controller 14. The voltage comparator 16 couples to both the voltage source 18 and the load 19 for voltage comparison and feeds back the comparison result to the controller 14 for controllable switches controlling purpose.

When the buck-boost regulator 10 is in operation, an input voltage signal from the voltage source 18 and an output voltage signal from the load 19 are fed into the voltage comparator 16 for comparison. The voltage comparator 16 is configured to make at least one type of comparison between the input voltage signal and the output voltage signal. In some embodiments, the voltage comparator 16 comprises at least one operational amplifier for comparison operation. Depending on the output of the comparator 16, the controller 14 generates output signals to switch ON/OFF one or more of the plurality of controllable switches 11 and therefore causes the DC conversion circuit 13 (or the buck-boost regulator 10) to operate in one of three modes including a buck mode, a boost mode and a buck-boost mode.

In some embodiments, the buck-boost regulator 10 also comprises a memory 17 loaded with controlling logic accessible and executable by the controller 14 for implementation of desired controllable switches ON/OFF controlling. In some embodiments, the memory 17 and the controller 14 are integrated into a single component.

If the input voltage is lower than the output voltage by a first threshold, the regulator operates in boost (step-up) mode. If the input voltage is higher than the output voltage by a second threshold, it operates in buck (step-down) mode. The regulator operates in the buck-boost mode when the difference between the input and output voltages is within a certain range. In either the boost or the buck mode, the regulator 10 operates with two phases (a charging phase and a discharging phase) only. The controller 14 is configured to implement desired controllable switches ON/OFF controlling within each clock cycle (T) to charge the energy storage component 12 during the charging phase ($T_{ON}$) or discharge the energy storage component 12 during the discharging phase ($T_{OFF}$). The duty cycle ($T_{ON}/T$) is predetermined or adjusted dynamically according to the input voltage and expected output voltage. One with ordinary skill in the art would be familiar with DC-DC buck converter or DC-DC boost converter with charging phase and discharging phase only.

When the difference between the input and output voltages is within a certain range, the regulator 10 operates in the buck-boost mode. In the buck-boost mode, the regulator 10 may operate in one of three phases (phase 1, phase 2 or phase 3) instead of the charging or discharging phases as in regular boost or buck modes. The controller 14 is configured to implement desired controllable switches ON/OFF controlling within each clock cycle (T) to operate the regulator 10 in one of the three phases. The time lengths for the controller 14 operated in each phase within each clock cycle (T) may be predetermined or adjusted dynamically. The control logic for controlling the time lengths for each phase within one clock cycle may be stored in the memory 17 accessible and executable by the controller 14. The adoption of three phases enables that the regulator can enhance line transient performance when the input voltage and output voltage are close, and thus decrease current ripple due to small input voltage small disturbance.

In some embodiments, the buck-boost regulator 10 also comprises a current sensor 15 to measure current flow in the energy storage component 12 and feed back the measurement result to the controller 14 for switch controlling purpose. The energy storage component 12 may be one or more inductors, capacitors, or any combination of inductors and capacitors.

Figure 2:
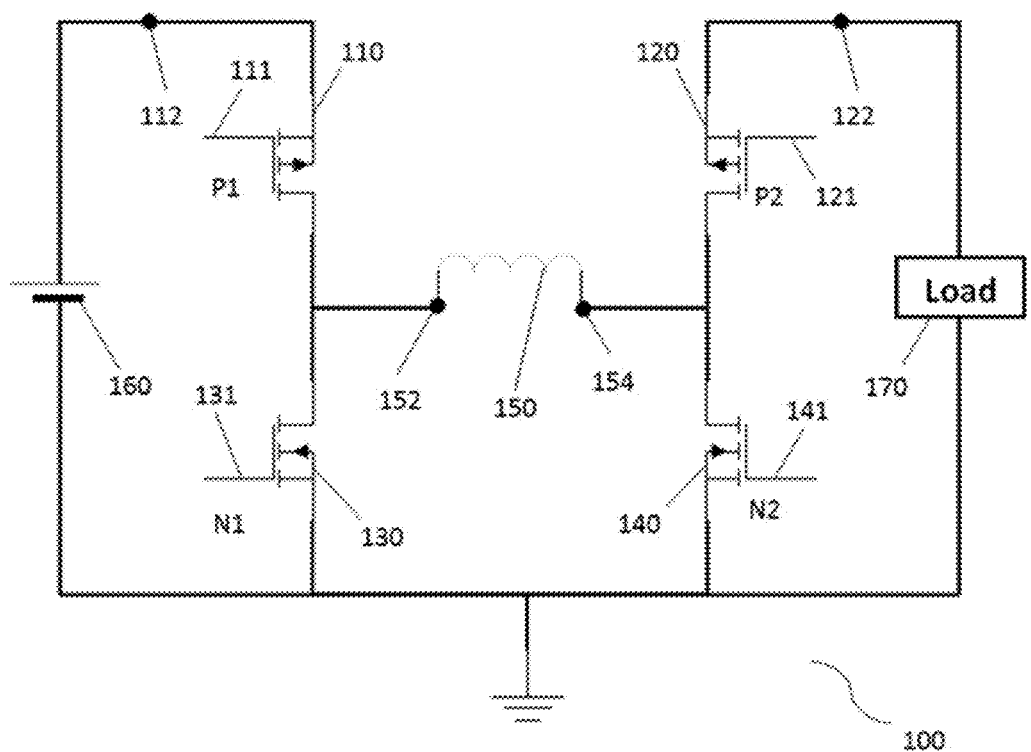
FIG. 2 is a schematic diagram of a buck-boost regulator according to various embodiments of the invention.

FIG. 2 illustrates a schematic diagram of a buck-boost regulator 100 according to various embodiments of the invention. The buck-boost regulator 100 comprises a plurality of switches including a first switch 110, a second switch 120, a third switch 130 and a fourth switch 140. The switches and an inductor 150 form a bridge circuit with the inductor connecting two switch branches. In one embodiment, the inductor 150 is an external inductor and connects the buck-boost regulator via a first inductor connection port 152 and a second inductor connection port 154. In another embodiment, the inductor 150 may be a built-in inductor integrated within the buck-boost regulator 100. The first switch 110 connects to a DC voltage input 160 via an input port 112 and the second switch 120 connects to a load 170 via an output port 122. In one embodiment, the switches are a transistor type switch such as a metal-oxide-semiconductor field-effect transistor (MOSFET). In some embodiments, the first switch 110 and the second switch 120 are PMOS transistor. The third switch 130 and the fourth switch 140 are NMOS transistor. Each of the switches (110, 120, 130 or 140) has a control gate (111, 121, 131, or 141) to receive control signal for switch ON/OFF control. The switches may be switched ON/OFF individually or in pair. One skilled in the art will recognize that other types of switches may be used for buck-boost regulator. One skilled in the art will also recognize that various other components, such as input coupling capacitor and output coupling capacitor, may also be included in the buck-boost regulator. Such variations may be still within the scope of this invention.

Figure 3:
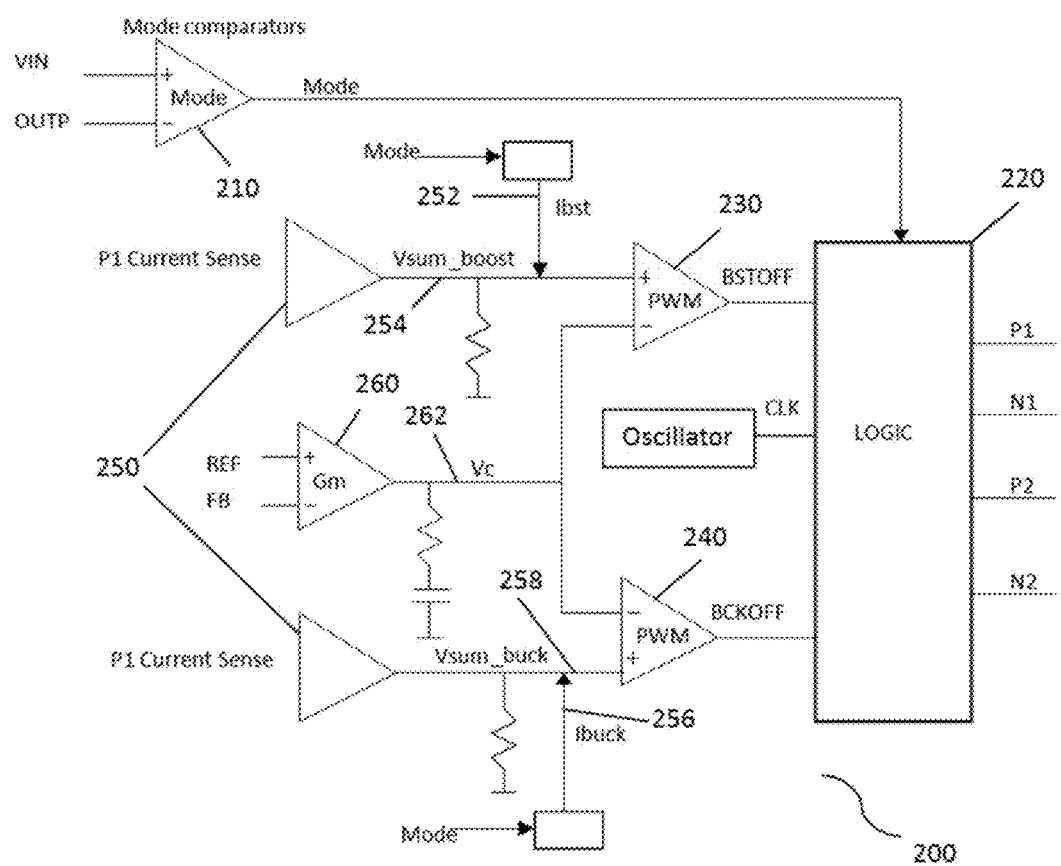
FIG. 3 is a topology of the buck-boost converter according to various embodiments of the invention.

FIG. 3 is an exemplary topology of the buck-boost converter according to various embodiments of the invention. The topology 200 comprises at least a comparator 210 and a logic circuit 220. The comparator 210 is operatively connected to the input port 112 and the output port 122 such that the input voltage signal and output voltage signal are fed into the comparator 210 for comparison. The voltage comparator 210 is configured to make at least one type of comparison between the input voltage signal and the output voltage signal. The output of the comparator 210, a first PWM (pulse width modulation) comparator 230 and a second PWM comparator 240 are fed into the logic circuit 220. The outputs of the logic circuit 220 are operatively connected to the control gates (111, 121, 131, and 141) of the switches (110, 120, 130 and 140). Depending on the output of the comparators 210, 230 and 240, the logic circuit 220 generates logic circuit output signals to switch ON/OFF one or more of the switches (110, 120, 130 and 140).

In one embodiment, the voltage comparator 210 is configured to make two types of comparisons between the input voltage signal and the output voltage signal. When the input voltage of the DC voltage input 160 is less than the output voltage by a first threshold, the buck-boost regulator is operated in a boost mode. When the input voltage of the DC voltage input 160 is larger than the output voltage by a second threshold, the buck-boost regulator is operated in a buck mode. When the input voltage of the DC voltage input 160 is between a first threshold and the second threshold, the buck-boost regulator is operated in a buck-boost mode. In some embodiments, the first threshold is 80%, 85%, 90% or 95% of the output voltage. In some embodiments, the second threshold is 105%, 110%, 115% or 120% of the output voltage. The first threshold and the second threshold may or may not be symmetric around the output voltage. For example, when the first threshold is 90% of the output voltage and the second threshold is 110% of the output voltage, the buck-boost regulate operates in the boost mode when the input voltage is less than 90% of the output voltage, in the buck mode when the input voltage is larger than 110% of the output voltage or in the buck-boost mode when the input voltage is between 90% and 110% of the output voltage.

Figure 4:
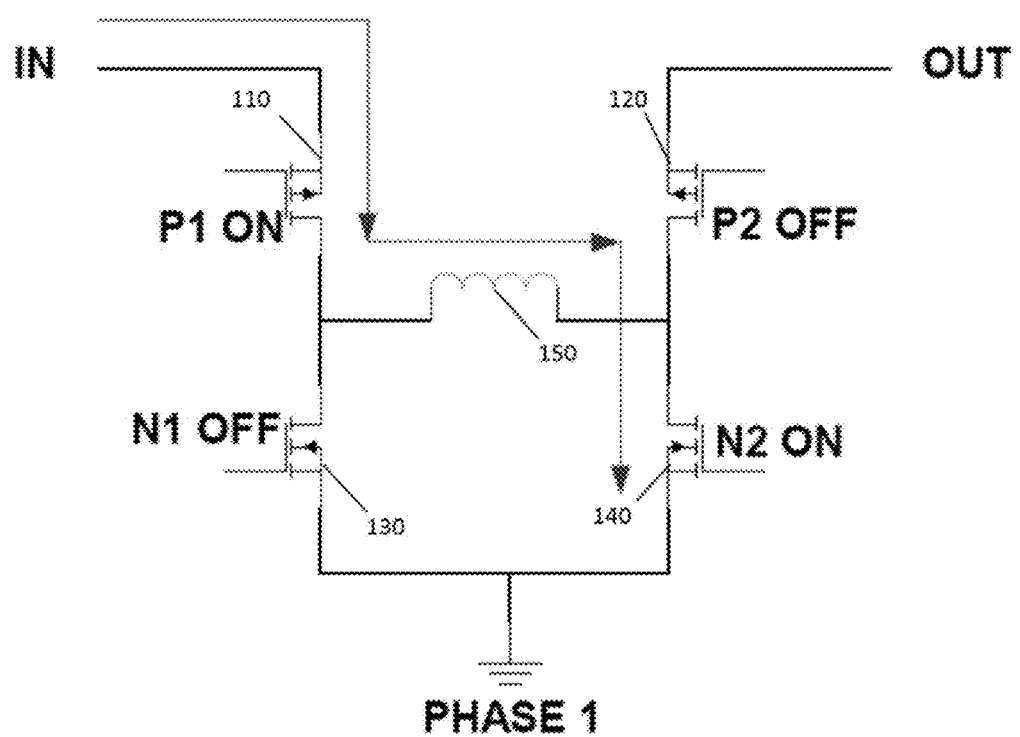
FIG. 4 shows current path of the buck-boost regulator in phase 1 according to various embodiments of the invention.

FIG. 4 shows current path of the buck-boost regulator in phase 1 according to various embodiments of the invention. In phase 1, the first switch 110 and the fourth switch 140 receive control signal to switch ON. The second switch 120 and the third switch 130 receive control signal to switch OFF. Therefore, the inductor 150 has a charging current path between the voltage input and ground.

Figure 5:
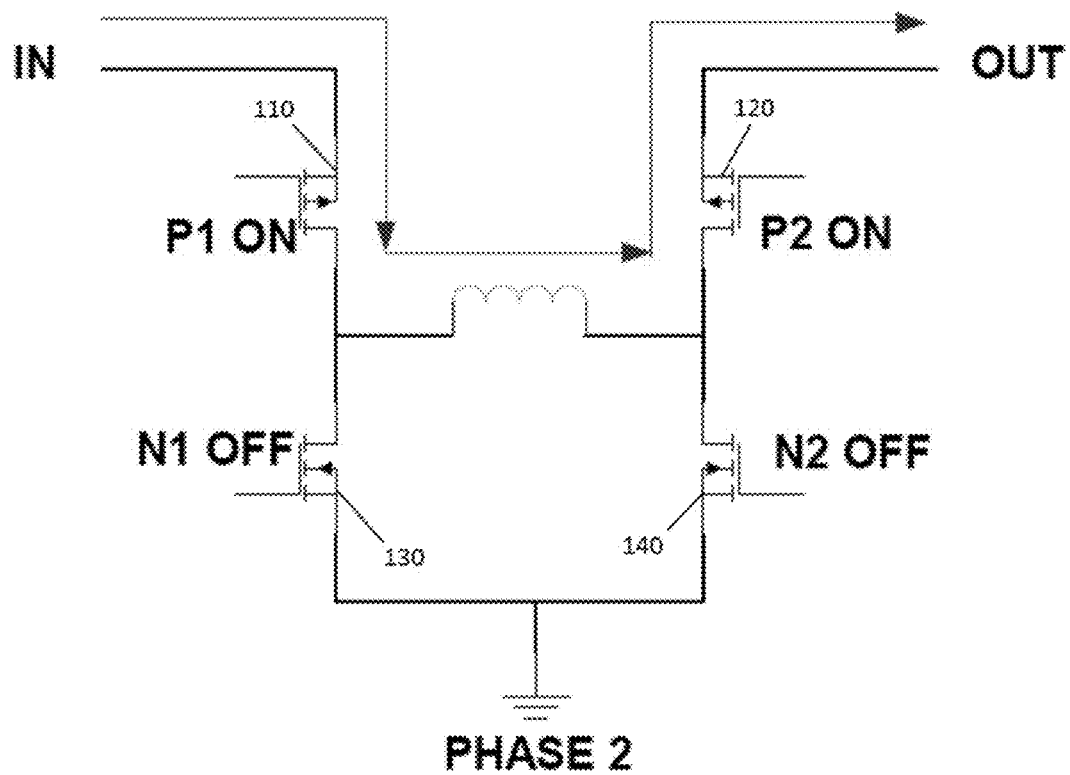
FIG. 5 shows current path of the buck-boost regulator in phase 2 according to various embodiments of the invention.

FIG. 5 shows current path of the buck-boost regulator in phase 2 according to various embodiments of the invention. In phase 2, the first switch 110 and the second switch 120 receive control signal to switch ON. The third switch 130 and the fourth switch 140 receive control signal to switch OFF. Therefore, the inductor 150 has a current path between the voltage input and the voltage output. Depending on the input voltage level and output voltage level, the inductor 150 may charge or discharge inductor current.

Figure 6:
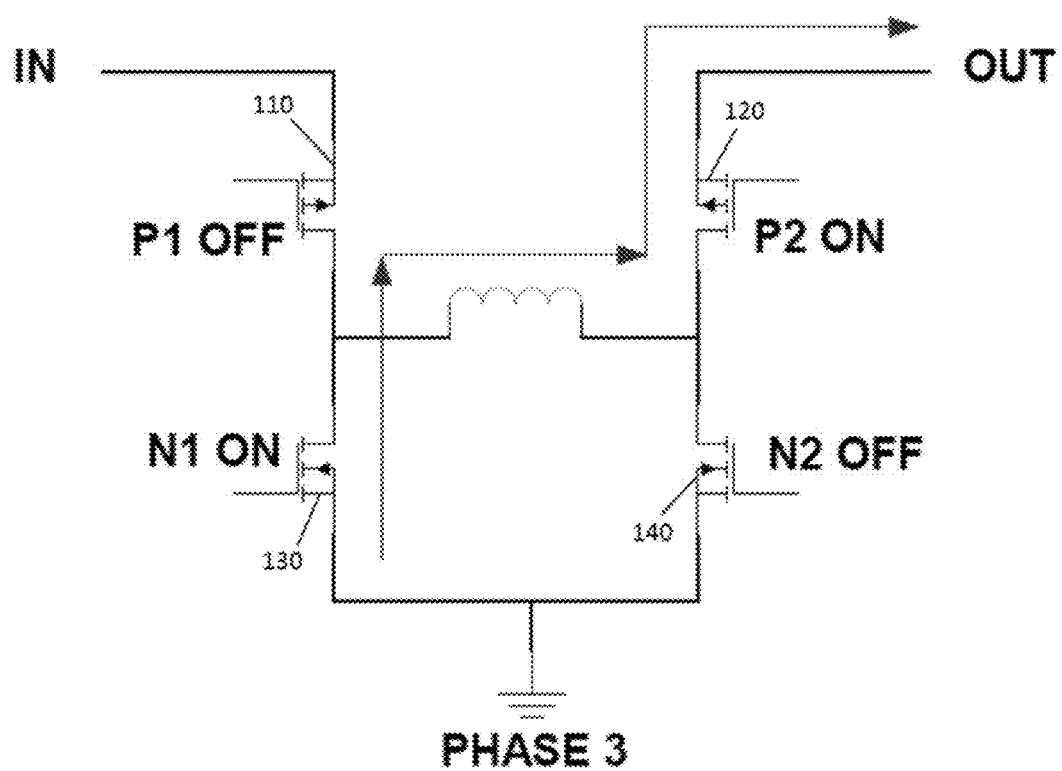
FIG. 6 shows current path of the buck-boost regulator in phase 3 according to various embodiments of the invention.

FIG. 6 shows current path of the buck-boost regulator in phase 3 according to various embodiments of the invention. In phase 3, the first switch 110 and the fourth switch 140 receive control signal to switch OFF. The second switch 120 and the third switch 130 receive control signal to switch ON. Therefore, the inductor 150 has a discharging current path between the voltage output and ground. The adoption of three phases enables that the regulator can work regardless from the minimum $T_{on}/T_{off}$ limitation.

Figure 7:
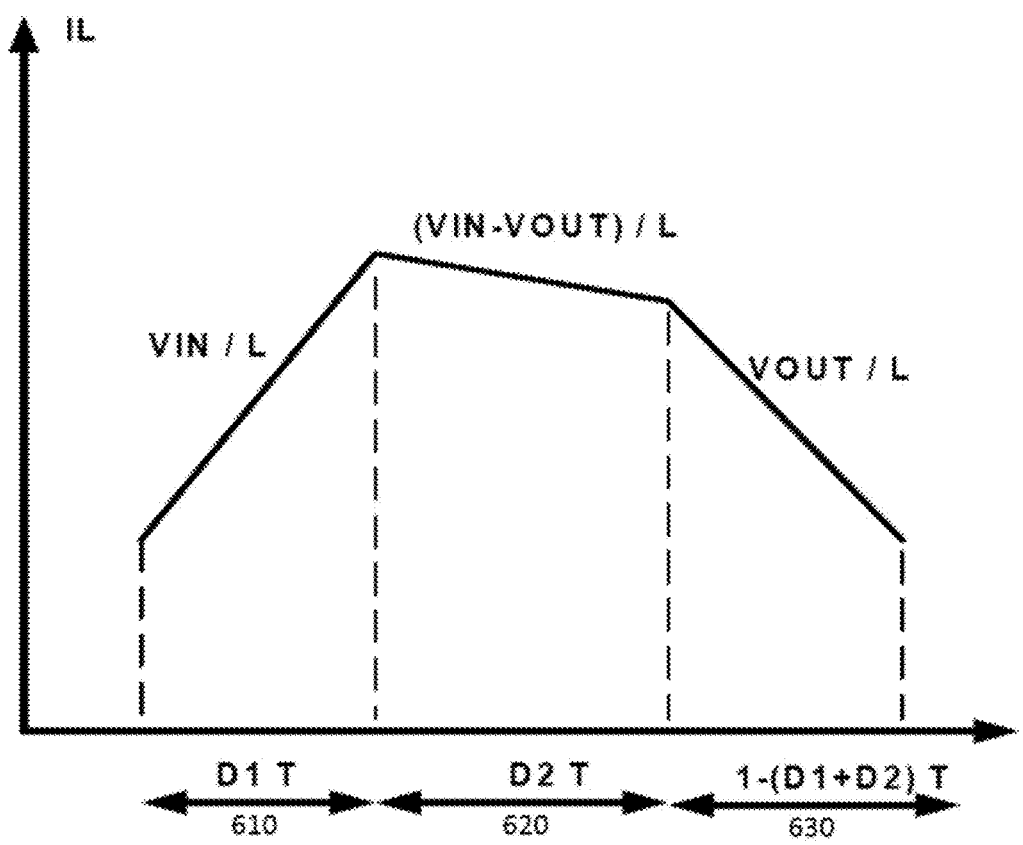
FIG. 7 shows in details three operation phases in which each clock cycle has been split according to various embodiments of the invention.

FIG. 7 shows in details three operation phases in which each clock cycle has been split in buck-boost mode according to various embodiments of the invention. Each clock cycle is divided into three phases as Phase 1 (610), Phase 2 (620), or Phase 3 (630) with different times for each phase within one clock cycle. The vertical axis in FIG. 7 is the inductor current (IL). In phase 1, the IL slope (dIL/dt) is $V_{in}/L$. In phase 2, the IL slope is $(V_{in}-V_{out})/L$. In phase 3, the IL slope is $V_{out}/L$. Phase 1 lasts D1 T time, wherein T is time period of the clock cycle and D1 is a first percent value. Phase 2 lasts D2 T time, wherein D2 is a second percent value. Phase 2 lasts the rest time within the clock cycle. In one embodiment, the parameters D1 and D2 are fixed values. In another embodiment, the parameters D1 and D2 may be pre-programmed or adjusted dynamically. The IL profile in FIG. 7 is only for exemplary purpose. Various other embodiments may exit. For example, the sequence of three phases may be different from the IL profile shown in FIG. 7. The slope of IL in phase 2 may be negative or zero, depending on the difference of $V_{IN}$ and $V_{OUT}$. The sequence of the three phases may or may not be the same as shown in FIG. 7. Various modifications may be possible within the scope and equivalence of this invention.

Figure 8:
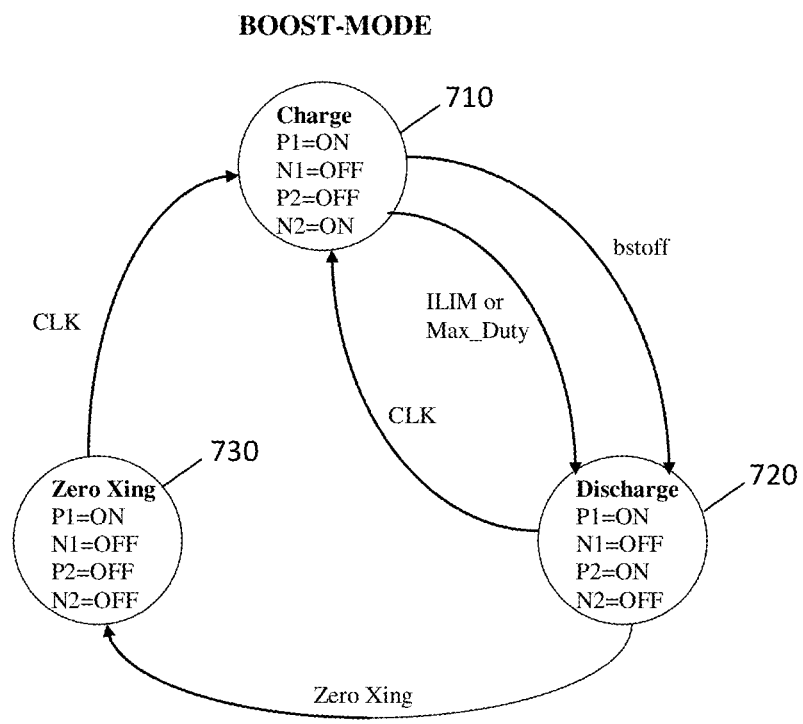
FIG. 8 shows three possible states of the buck-boost regulator in boost mode according to various embodiments of the invention.
Figure 9:
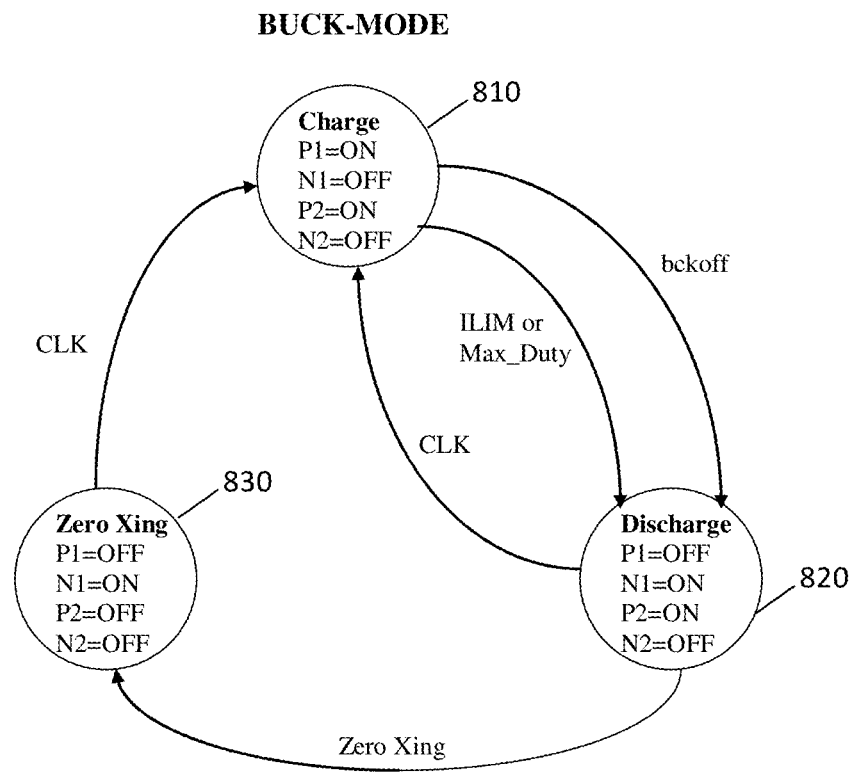
FIG. 9 shows three possible states of the buck-boost regulator in buck mode according to various embodiments of the invention.
Figure 10:
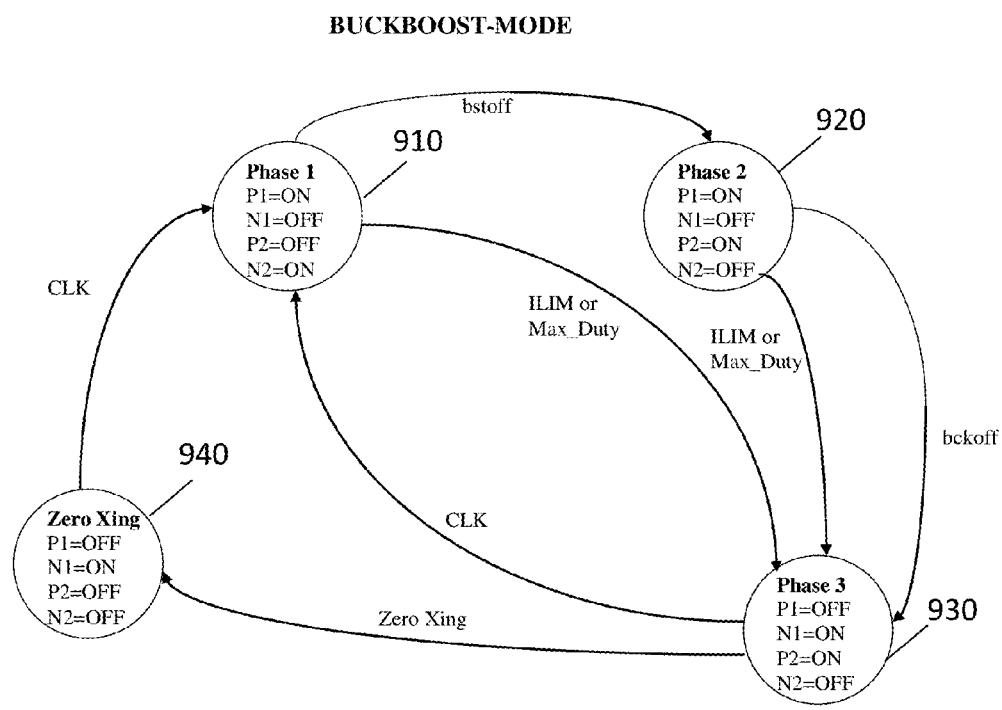
FIG. 10 shows three possible phases of the buck-boost regulator in buck-boost mode according to various embodiments of the invention.

As shown in FIGS. 8-10, the regulator can operate in a boost mode, a buck mode or a buck-boost mode when the input is within the first threshold and the second threshold. The output voltage of the buck-boost regulator thus remains constant through mode changes and the ripple voltage is well-controlled.

FIG. 8 shows three possible phases (two operational phases and one transitional phase) of the buck-boost regulator in the boost mode according to various embodiments of the invention. In a charge phase 710, the first switch 110 (P1) and the fourth switch 140 (N2) receive control signal to switch ON. The second switch 120 (P2) and the third switch 130 (N1) receive control signal to switch OFF. The inductor 150 has a charge current path from the voltage input to ground. In a discharge phase 720, the first switch 110 (P1) and the second switch 120 (P2) receive control signal to switch ON. The third switch 130 (N1) and the fourth switch 140 (N2) receive control signal to switch OFF. The inductor 150 has a discharge current path from the DC voltage input 160 to the load 170. In a zero crossing (Zero Xing) phase 730 (an optional transitional phase between the charge phase 710 and discharge phase 720), only the first switch 110 (P1) receives control signal to switch ON and all the other three switches are switched OFF. There is no current path in the inductor 150. The buck-boost regulator 100 may switch from one state to another state under difference control signals. For example, the buck-boost regulator 100 may switch from the charge phase 710 to the discharge phase 720 with a boost off (bstoff) signal when the first PWM comparator 230 outputs the bstoff signal to the logic circuit 220. The buck-boost regulator 100 may switch from the discharge phase 720 to the charge phase 710 directly or via the Zero Xing phase 730. In the discharge phase 720, the current in the inductor 150 is monitored by a P1 current sensor 250. When the current in the inductor 150 becomes zero or very close to zero, the second switch 120 (P2) is configured to switch OFF and cause the buck-boost regulator 100 to enter the Zero Xing phase 730. The switching OFF moment during zero inductor current prevents ringing in the inductor in discontinuous conduction and the resulting RF noise. In some embodiments, the buck-boost regulator 100 may switch from the discharge phase 720 to the Zero Xing phase 730 in a unidirectional way and switch from the Zero Xing phase 730 to the charge phase 710 in a unidirectional way. In some embodiments, when the buck-boost regulator is operated on boost mode, the Zero Xing phase 730 is enabled only after the fourth switch 140 (N2) switches off, wherein the charging phase ends.

FIG. 9 shows three possible phases (two operational phases and one transitional phase) of the buck-boost regulator in buck mode according to various embodiments of the invention. In a charge phase 810, the first switch 110 (P1) and the second switch 120 (P2) receive control signal to switch ON. The third switch 130 (N1) and the fourth switch 140 (N2) receive control signal to switch OFF. The inductor 150 has a charge current path from the DC voltage input 160 to the load 170. In a discharge phase 820, the first switch 110 (P1) and the fourth switch 140 (N2) receive control signal to switch OFF; the third switch 130 (N1) and the second switch 120 (P2) receive control signal to switch ON. The buck-boost regulator 100 may switch from the charge phase 810 to the discharge phase 820 with a buck off (bckoff) signal when the second PWM comparator 240 outputs the bckoff signal to the logic circuit 220. The inductor 150 has a discharge current path from the load 170 to ground. In a zero crossing (Zero Xing) phase 830 (an optional transitional phase between the charge phase 810 and discharge phase 820), only the third switch 130 (N1) receives control signal to switch ON and all the other three switches are switched OFF. In the discharge phase 820, the current in the inductor 150 is monitored by the P1 current sensor 250. When the current in the inductor 150 is zero or very close to zero, the second switch 120 (P2) is configured to switch OFF and cause the buck-boost regulator 100 enter the Zero Xing state 830. In some embodiments, the buck-boost regulator 100 may switch from the discharge phase 820 to the Zero Xing phase 830 in a unidirectional way and switch from the Zero Xing phase 830 to the charge phase 810 in a unidirectional way. In some embodiments, when the buck-boost regulator is operated on buck mode, the Zero Xing phase 830 is enabled only after the fourth switch 140 (N2) switches off, wherein the charging phase ends.

FIG. 10 shows three possible regular phases of the buck-boost regulator in buck-boost mode according to various embodiments of the invention. The buck-boost regulator 100 may operate in either phase 1 (910), phase 2 (920) or phase 3 (930). The buck-boost regulator 100 may also in an optional transitional Zero Xing phase (940) during the transition from phase 3 to phase 1. In phase 1, the first switch 110 (P1) and the fourth switch 140 (N2) receive control signal to switch ON. The second switch 120 (P2) and the third switch 130 (N1) receive control signal to switch OFF. In phase 2, the first switch 110 and the second switch 120 receive control signal to switch ON. The third switch 130 and the fourth switch 140 receive control signal to switch OFF. In phase 3, the first switch 110 and the fourth switch 140 receive control signal to switch OFF. The second switch 120 and the third switch 130 receive control signal to switch ON. The buck-boost regulator 100 may switch from one phase to another phase under difference control signals. In some embodiments, the buck-boost regulator 100 may switch from the phase 1 (910) to the phase 2 (920) in a unidirectional way with a boost off (bstoff) signal when the first PWM comparator 230 outputs the bstoff signal to the logic circuit 220. The buck-boost regulator 100 may also switch from the phase 2 (920) to the phase 3 (930) in a unidirectional way with a buck off (bckoff) signal when the second PWM comparator 240 outputs the bckoff signal to the logic circuit 220.

In some other embodiments, the buck-boost regulator 100 may switch from the phase 3 (930) to the Zero Xing phase 940 in a unidirectional way and switch from the Zero Xing state (940) to the phase 1 (910) in a unidirectional way. When the buck-boost regulator operates under phase 3 (930), the current in the inductor 150 is monitored by a P1 current sensor 250. When the current in the inductor 150 becomes zero or very close to zero, the second switch 120 (P2) is configured to switch OFF and cause the buck-boost regulator 100 to enter the Zero Xing phase 940. In some embodiments, when the buck-boost regulator is operated on buck-boost mode, the Zero Xing phase 940 is enabled only after the first switch 110 (P1) switches off, wherein the charging phase ends.

Figure 11:
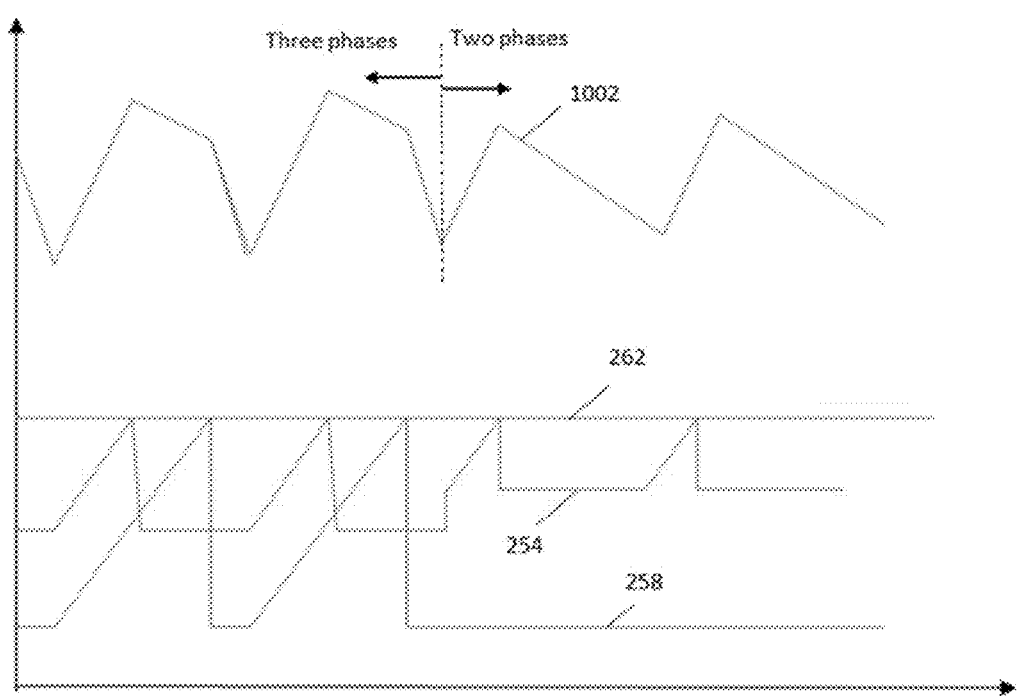
FIG. 11 shows exemplary multiple waveforms showing a transition from three phases to two phases boost mode.

FIG. 11 discloses multiple exemplary multiple waveforms showing a transition from three phases to two phases boost mode. FIG. 11 contains waveforms of inductor current 1002, current loop control signal $V_c$ 262, $V_{Sum\_BST}$ 254 and $V_{Sum\_BCK}$ 258. The waveforms correspond to the topology of the buck-boost converter shown in FIG. 3. It is clear from the waveform of inductor current 1002 that the buck-boost converter transits from a three-phase mode to a two-phase boost mode. The current loop control signal $V_c$ 262 is actually output of an amplifier 260, which receives input from a reference voltage and an output feedback voltage. The $V_{Sum\_BST}$ 254 is the sum of a current signal from the P1 current sensor 250 and a first voltage ramp signal (Ibst) 252. The $V_{Sum\_BCK}$ 258 is the sum of the current signal from the P1 current sensor 250 and a second voltage ramp signal (Ibuck) 256. The first ramp signal (Ibst) 252 and the second voltage ramp signal (Ibuck) 256 are normally used as "slope compensation" to avoid sub-harmonic distortion in any current mode DC-DC switching regulator. In one embodiment, the first ramp signal (Ibst) 252 and the second voltage ramp signal (Ibuck) 256 are output signal from the voltage comparator 210. When the buck-boost converter operates in the three phases mode, both $V_{Sum\_BST}$ 254 and $V_{Sum\_BCK}$ 258 signals are used for the control of the logic circuit 220. After the transition, the buck-boost converter operates in the two phases boost mode. The $V_{Sum\_BCK}$ 258 signal disappears and only the $V_{Sum\_BST}$ 254 is used for the control of the logic circuit 220 and offsets changes to minimize the current loop control signal $V_c$ 262 variation in order to optimize the line transient.

One skilled in the art will also recognize that various embodiments of converting DC voltage in a buck-boost regulator. Aspects of this invention will also apply to three phases controller for buck-boost regulator apparatuses and methods. The foregoing description of the invention has been described for purposes of clarity and understanding. It is not intended to limit the invention to the precise form disclosed. Various modifications may be possible within the scope and equivalence of the appended claims.

The invention claimed is:

1. A buck-boost regulator comprising:
a DC conversion circuit coupled between a voltage source and a load, the DC conversion circuit comprising at least one energy storage component and a plurality of controllable switches;
a voltage comparator making at least one voltage comparison between an input voltage from the voltage source and an output voltage to the load; and
a controller receiving the at least one voltage comparison from the voltage comparator and based on the at least one voltage comparison, causing the DC conversion circuit to operate in one of three modes including a buck mode, a boost mode and a buck-boost mode, one controllable switch within the plurality of controllable switches is exclusively on during a transitional phase in the buck-boost mode such that there is not a closed electrical circuit for the at least one energy storage component.

2. The buck-boost regulator of claim 1 wherein the controller causes the DC conversion circuit to operate in a boost mode when the input voltage is lower than the output voltage by a first threshold.

3. The buck-boost regulator of claim 2 wherein the first threshold is 80%, 85%, 90% or 95% of the output voltage.

4. The buck-boost regulator of claim 1 wherein the controller causes the DC conversion circuit to operate in a buck mode when the input voltage is higher than the output voltage by a second threshold.

5. The buck-boost regulator of claim 4 wherein the second threshold is 105%, 110%, 115% or 120% of the output voltage.

6. The buck-boost regulator of claim 1 wherein the controller causes the DC conversion circuit to operate in a buck-boost mode when the difference between the input and output voltages is within a certain range.

7. The buck-boost regulator of claim 6 wherein the certain range is defined as the input voltage falling between 90% and 110% of the output voltage.

8. A method of operating a buck-boost regulator comprising:
making at least one voltage comparison using one or more voltage comparators between an input voltage to buck-boost regulator and an output voltage from the buck-boost regulator; and
receiving at a controller the at least one voltage comparison from the one or more voltage comparators; and
operating the buck-boost regulator via the controller in one of three modes including a buck mode, a boost mode and a buck-boost mode, by switching one or more of a plurality of controllable switches within the buck-boost regulator based on the at least one voltage comparison, one controllable switch within the plurality of controllable switches is exclusively on during a transitional phase in the buck-boost mode such that there is not a closed electrical circuit for the at least one energy storage component.

9. The method of claim 8 wherein when the input voltage is lower than the output voltage by a first threshold, operating the buck-boost regulator in a boost mode.

10. The method of claim 9 wherein the first threshold is 80%, 85%, 90% or 95% of the output voltage.

11. The method of claim 8 wherein when the input voltage is higher than the output voltage by a second threshold, operating the buck-boost regulator in a buck mode.

12. Original) The method of claim of claim 11 wherein the second threshold is 105%, 110%, 115% or 120% of the output voltage.

13. The method of claim 8 wherein when the difference between the input and output voltages is within a certain range, operating the buck-boost regulator in a buck-boost mode.

14. The method of claim 13 wherein the certain range is defined as the input voltage falling between 90% and 110% of the output voltage.

15. A buck-boost regulator comprising:
a DC conversion circuit coupled between a voltage source and a load, the DC conversion circuit comprising at least one energy storage component and a plurality of controllable switches;
a current sensor measuring current flow in the at least one energy storage component;
a voltage comparator making at least one voltage comparison between an input voltage from the voltage source and an output voltage to the load; and
a controller receiving the at least one voltage comparison from the voltage comparator and the current flow measurement from the current sensor, and switching one or more of the plurality of controllable switches based on the at least one voltage comparison and the current flow measurement, the DC conversion circuit operating in a buck-boost mode when the difference between the input voltage and output voltage is within a certain range, one controllable switch within the plurality of controllable switches is exclusively on during a transitional phase in the buck-boost mode such that there is not a closed electrical circuit for the at least one energy storage component.

16. The buck-boost regulator of claim 15 wherein in the buck-boost mode, the buck-boost regulator operates in one of three phases within one clock cycle.

17. The buck-boost regulator of claim 15 wherein in the buck-boost mode, the buck- boost regulator switches from one of the three operational phases to another one of the three operational phases in a unidirectional way.

18. The buck-boost regulator of claim 15 wherein in the buck-boost mode, the buck- boost regulator switches from one of the three phases to another one of the three phases via the transitional phase in a unidirectional way, wherein the buck- boost regulator enters the transitional phase only when the current flow measurement from the current sensor becomes zero or very close to zero.

* * * * *